Oct. 7, 1958   J. SIRMAY ET AL   2,854,834
KNITTING MACHINE
Filed June 21, 1954   10 Sheets-Sheet 1

INVENTORS
JULIUS SIRMAY
BY DAVID BIRD BRINTON
Nathan Levin
ATTORNEY

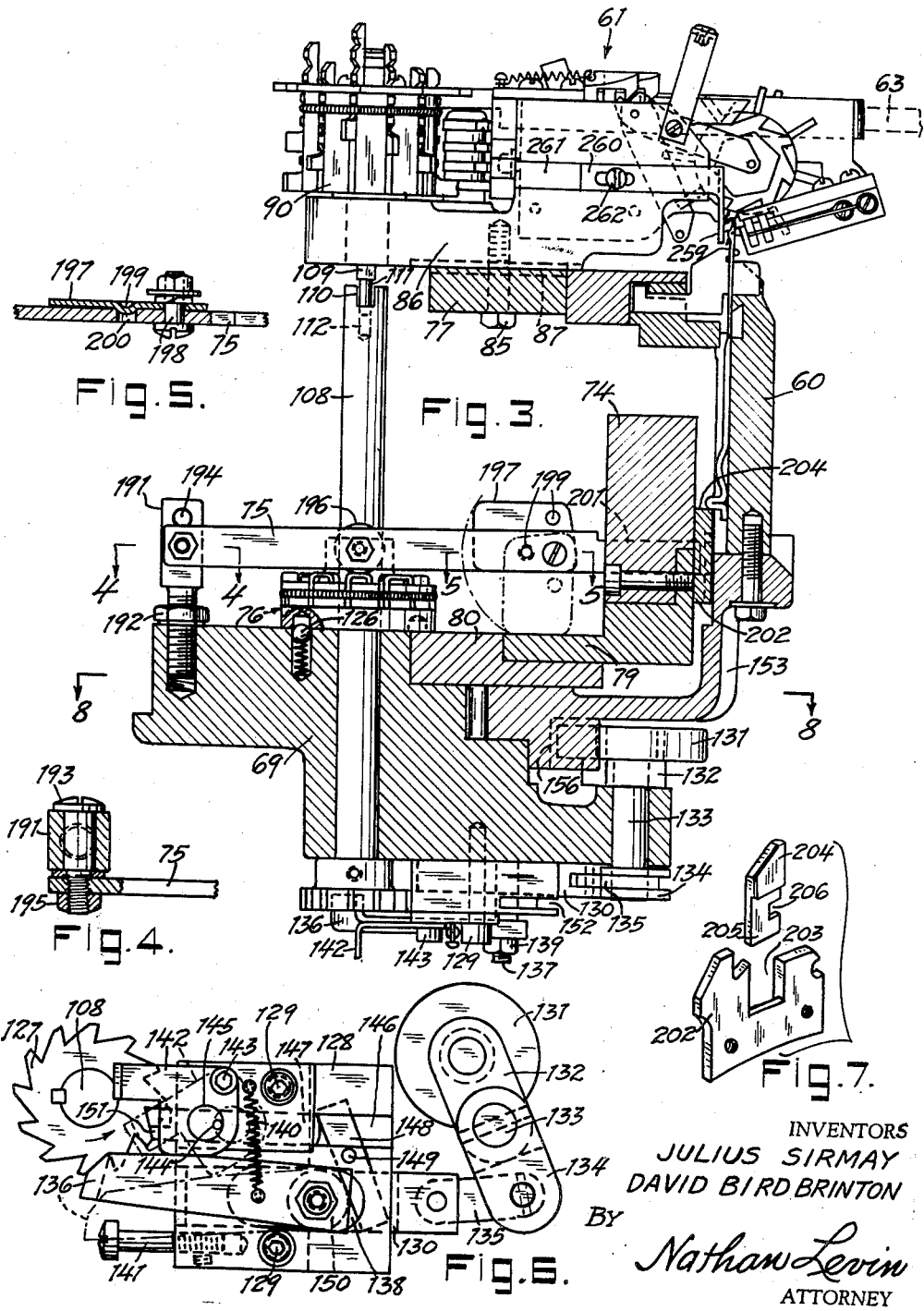

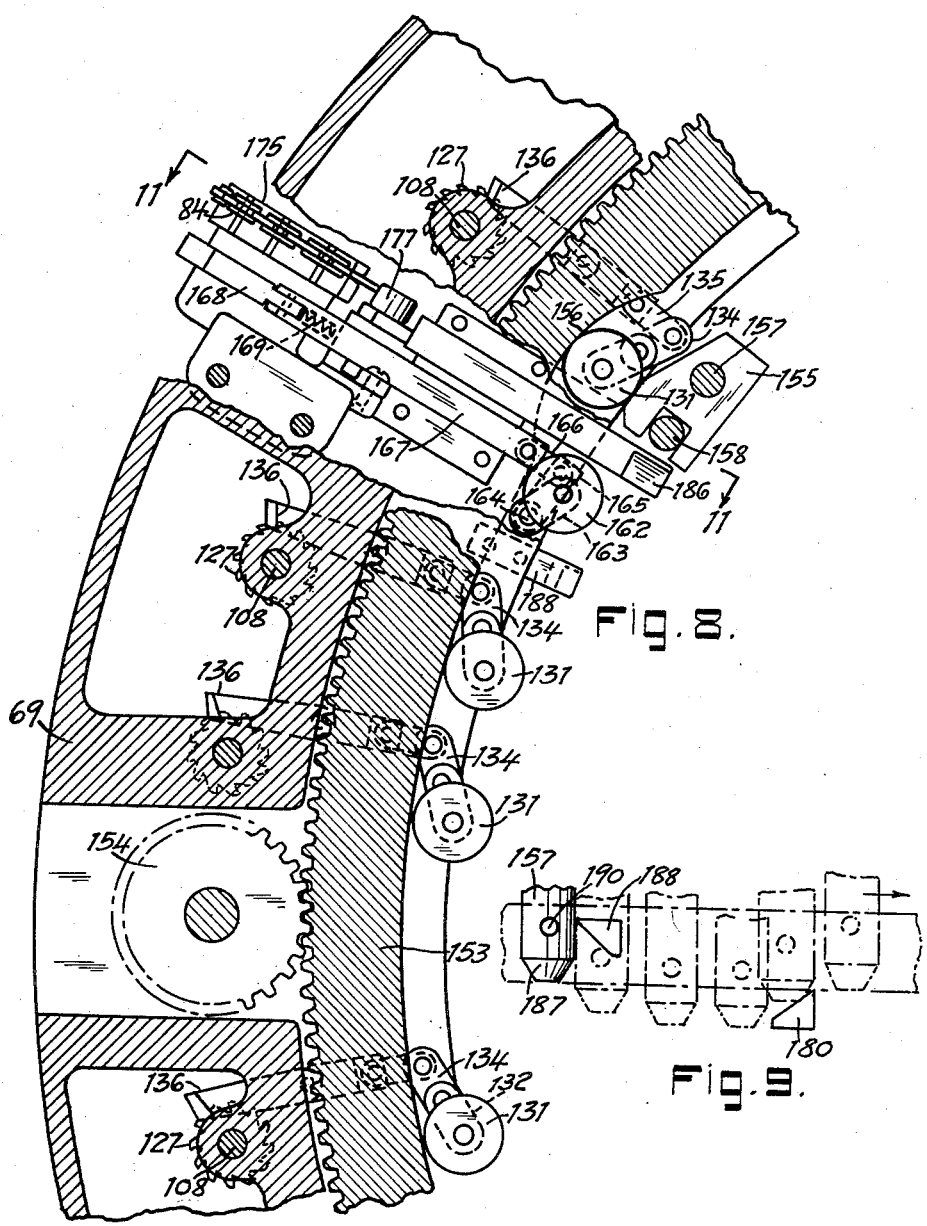

Oct. 7, 1958  J. SIRMAY ET AL  2,854,834
KNITTING MACHINE
Filed June 21, 1954  10 Sheets-Sheet 4

INVENTORS
JULIUS SIRMAY
DAVID BIRD BRINTON
BY Nathan Levin
ATTORNEY

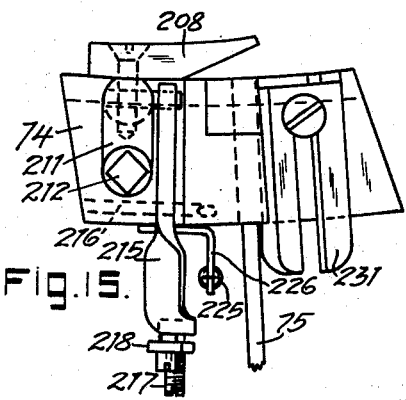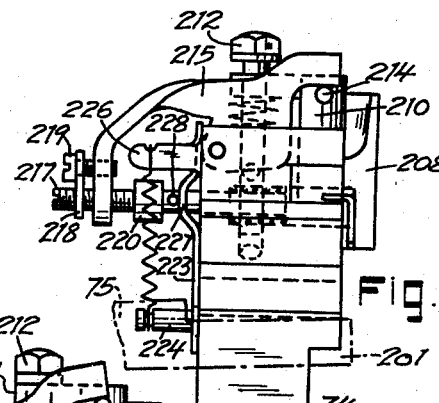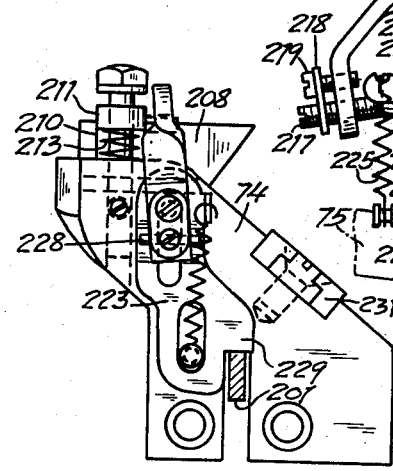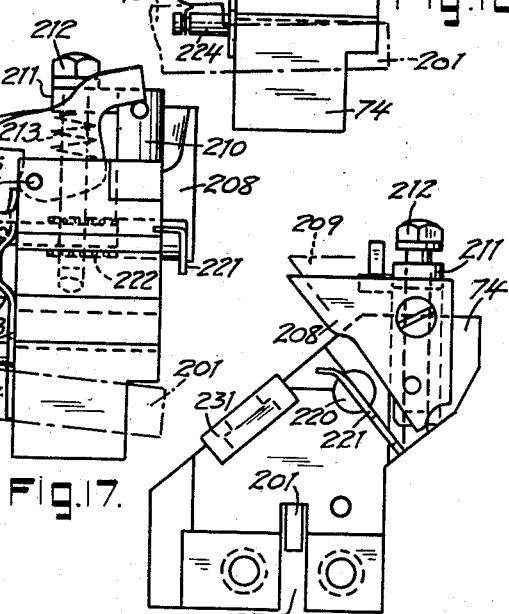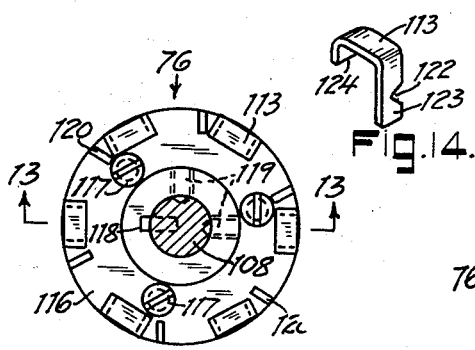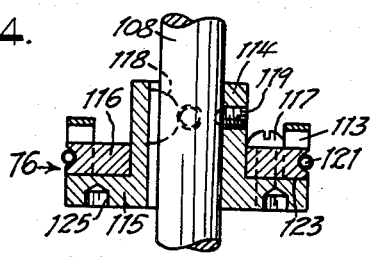

INVENTORS
JULIUS SIRMAY
DAVID BIRD BRINTON
BY Nathan Levin
ATTORNEY

Oct. 7, 1958    J. SIRMAY ET AL    2,854,834
KNITTING MACHINE

Filed June 21, 1954    10 Sheets-Sheet 7

*INVENTORS*
*JULIUS SIRMAY*
BY *DAVID BIRD BRINTON*

Nathan Levin
ATTORNEY

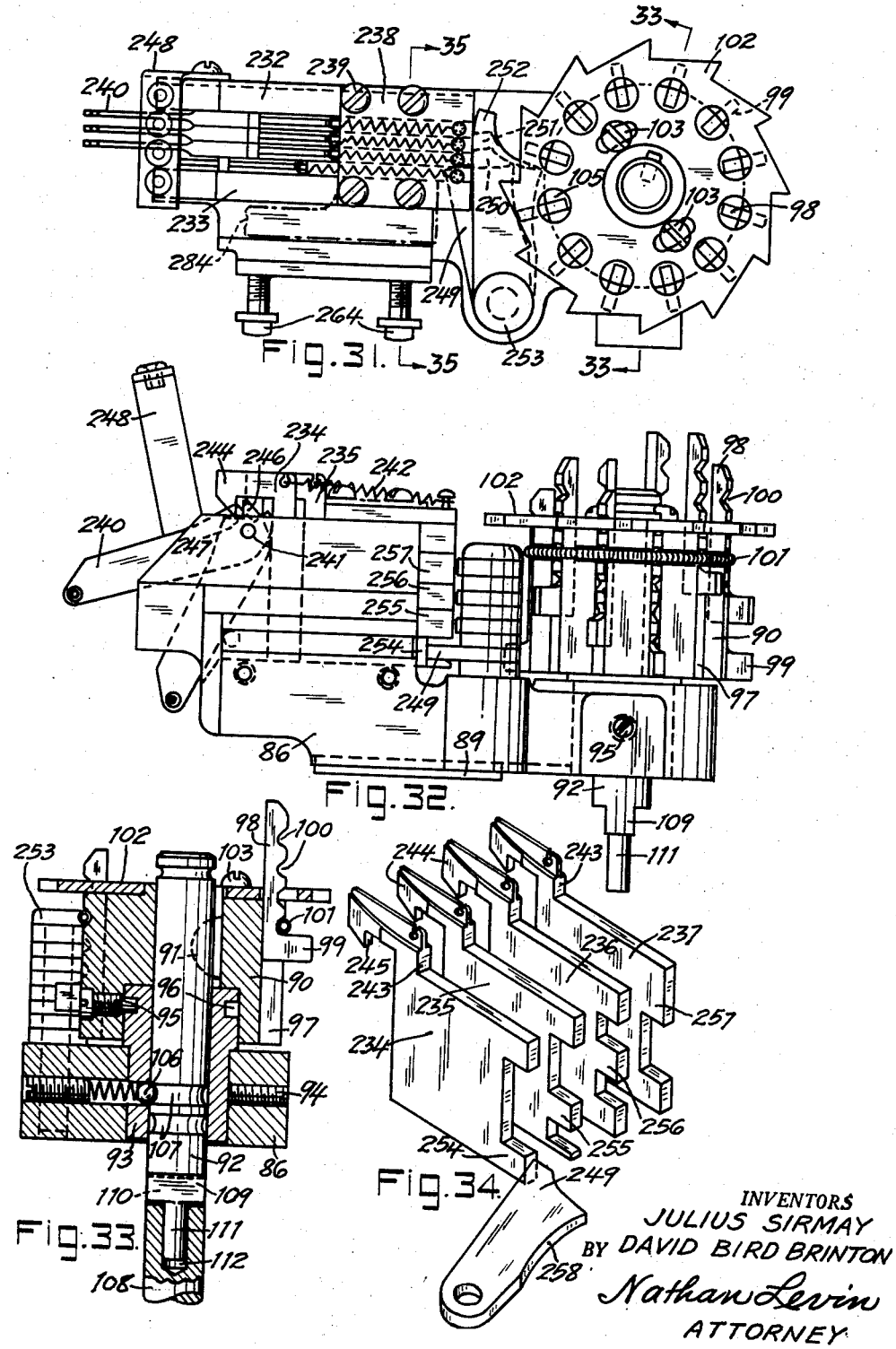

Oct. 7, 1958  J. SIRMAY ET AL  2,854,834
KNITTING MACHINE
Filed June 21, 1954  10 Sheets-Sheet 9
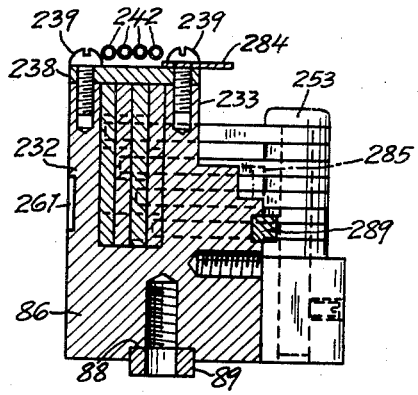
Fig. 35.
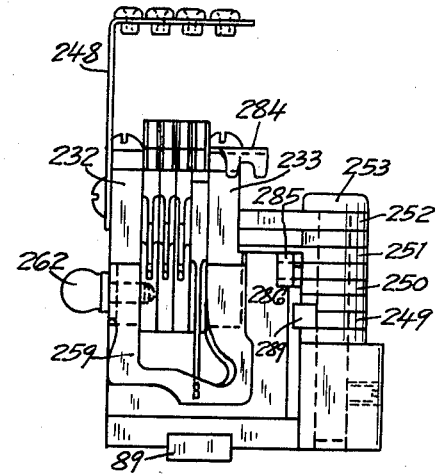
Fig. 36.
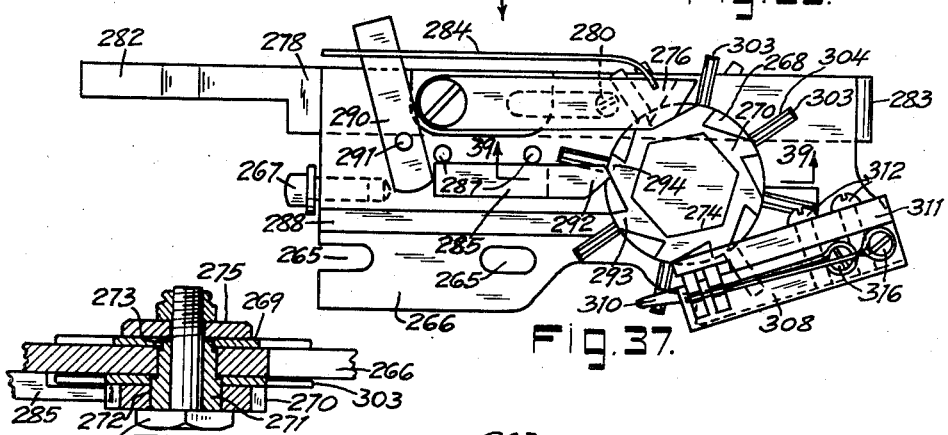
Fig. 37.
Fig. 39.
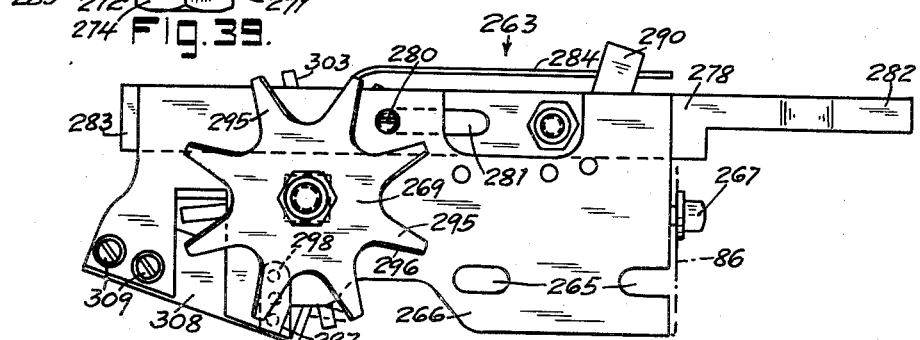
Fig. 38.
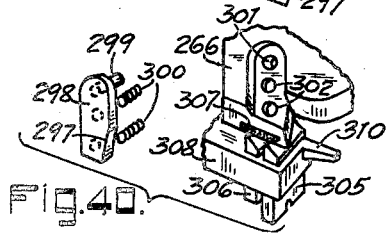
Fig. 40.
INVENTORS
JULIUS SIRMAY
BY DAVID BIRD BRINTON
Nathan Levin
ATTORNEY

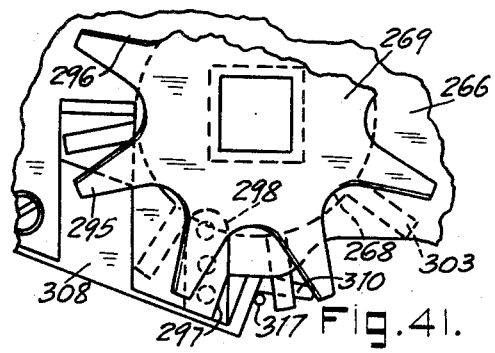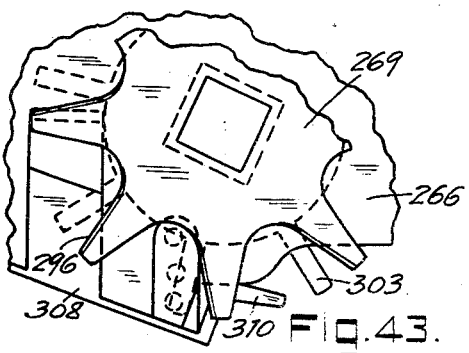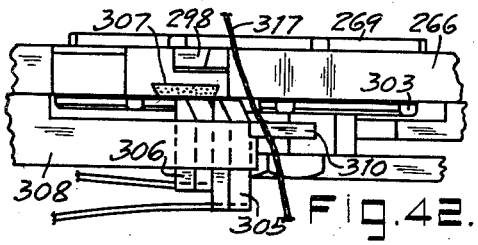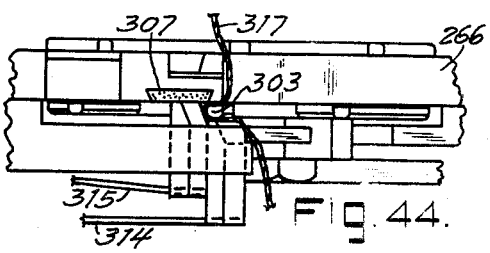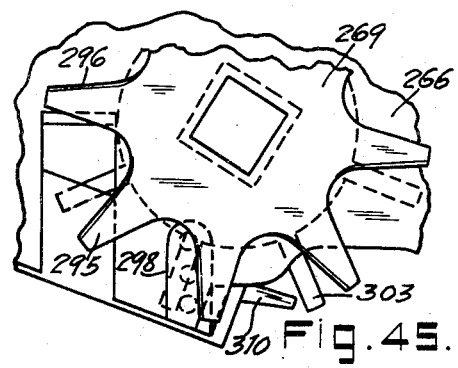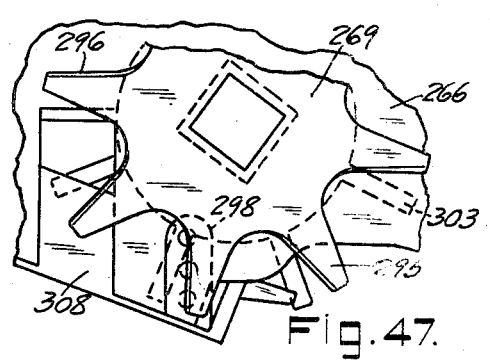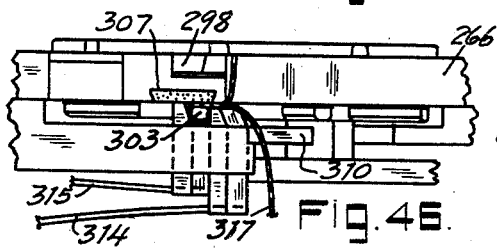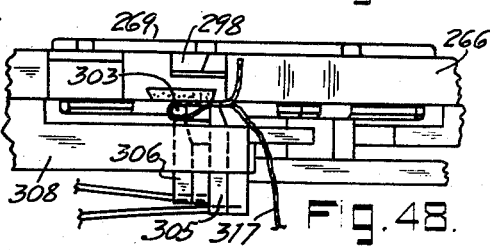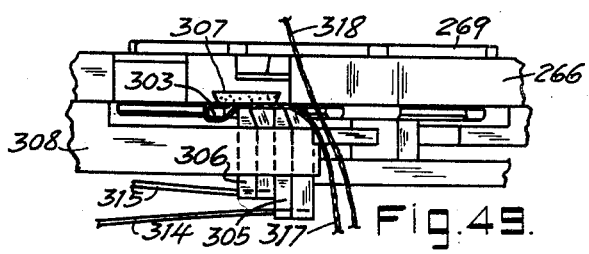

United States Patent Office 2,854,834
Patented Oct. 7, 1958

2,854,834

KNITTING MACHINE

Julius Sirmay, Philadelphia, and David Bird Brinton, Merion Station, Pa., assignors, by mesne assignments, to Scott & Williams, Inc., Laconia, N. H., a corporation of Massachusetts Application June 21, 1954, Serial No. 440,030

17 Claims. (Cl. 66—42)

The present invention relates to the art of knitting and more particularly to multiple feed circular independent latch needle knitting machines having selective yarn striping means and having selective needle controlling means at each feed of the machine.

It is an object of the invention to provide a selective yarn striping means or striper having a plurality of yarn feeding fingers and having a clamp and cutter for the idling yarns. The fingers are arranged so as to be quickly actuated from an indexible selector drum associated with the striper, the drum being provided with readily movable sliding jacks adapted to be placed where desired for the proper selection of the fingers as the drum is indexed. The jacks are held in place in slots in the drum by means of an encircling garter spring so that the striping pattern may be readily changed by manually positioning the jack butts at the proper level in relation to the fingers. The clamp and cutter portion of the striper is provided with an indexable rotary cutter which is given a step by step movement to cut the yarn to be idled and is also provided with an indexable rotary pusher which is likewise given a step by step movement to push the yarn to be idled into a clamp which has a pair of spaced yarn holding blades which hold all of the idled yarns. The indexing movement of the rotary cutter and rotary pusher of each striper is provided by a single cam rotating relatively to the stripers and operable at each striper only when a striping change is to be made at that striper under control of its striper-selector drum.

It is also an object to provide a special control for the needle operating cams at each feed of the machine, more particularly for the so called needle-nullifying cams following the usual inclined design wheel and for the usual needle stitch cam. The special control includes a second indexable selector drum of disk-like shape provided with readily positionable L-shaped jacks of two heights which are adapted to act through a lever to control the positions of the needle operating cams. The jacks are held in place in the drum by means of an encircling garter spring and are so related to the drum that they are able to exert a force in the axial direction of the drum. The lever may thus be given three positions to control the needle operating cams so that at each feed, depending upon the lever position, the feed may be out of action or it may be caused to knit only plain fabric or it may be caused to knit the pattern of its design wheel. It should be understood that when the feed is out of action that the striper is appropriately actuated to idle all the yarns.

It is a further object to mount the striper-selector drum and the needle-selector drum of each feed upon a single vertically positioned indexable shaft whereby the drums may be simultaneously turned. The striper-selector drum is adapted to be removeably connected to the shaft so that at desired times the shaft may be turned without indexing the striper drum and the control lever may be made inoperative in relation to the needle-selector drum so that at desired times the shaft may be turned without causing any needle cam changes to be made. Furthermore the indexing means for the shaft itself is so arranged that at desired times the shaft at any desired feed may be kept from turning.

It is a still further object to provide a single selectively positionable means, rotating about the machine relative to the shafts at each of the feeds, to successively index the shafts when the means (a cam) is operatively positioned by a single timing or length chain which is relatively stationary at one place on the machine. The cam (in either of its two vertical positions) is adapted to index the timing chain and in response to the chain is adapted to be selectively moved vertically to one or the other of two positions in only one of which the cam is adapted to index the shafts at each of the feeds.

It will be understood the control data for each feed is carried by the jacks of its two selector drums and that only a single simple timing or length chain need be provided for the machine to determine the activity of the selector drums whereby there is individual knitting control at each feed of the machine.

Another object of the invention is to provide step by step indexing means of the ratchet and pawl type which may be used for the various indexable members and which will positively prevent overthrowing of the members as they are indexed during the operation of the machine. The importance of properly indexing the various members, such as the drums, the chain and the clamp and cutter, is self evident for perfect knitting depends upon each member doing its proper function at the proper time. While there are other means to positively index rotatable members, one of the simplest means of indexing is by using a ratchet and pawl. The ratchet and pawl when used for high speed indexing has the disadvantage of sometimes overthrowing the ratchet because of the inertia of the turning portion of the mechanism associated with the ratchet and this may happen regardless of the friction supplied to prevent overthrow. Such friction means is undesirable because of the heat generated and because it often is very large. In the present instance the ratchet is automatically positively held against overthrowing by means of an additional stop arm which is moved into contact with successive teeth of the ratchet, without interfering with its turning, by movement of the pawl after the ratchet has been partially indexed.

The objects of the invention as they have been set forth, and others as they may appear, will be apparent from the following detailed description of the embodiment of the knitting machine illustrated in the accompanying drawings.

In the drawings:

Figure 3 is a view, partially in section, taken through one of the feeds of the machine (all of the feeds being alike) and showing the relative disposition of the striper, the needle cam controls, the indexable vertical shaft and the means for indexing the shaft.

Figure 4 is a detail view taken on line 4—4 of Figure 3 to show the pivotal mounting of the needle cam control lever.

Figure 5 is a detail view taken on line 5—5 of Figure 3 to show the mounting of the nullifying plate on the needle cam control lever.

Figure 6 is a bottom view of a portion of Figure 3 to show the means for indexing the vertical drum shaft.

Figure 7 is a detail view in perspective showing certain of the cams at each feed including one of the cams directly moved by the control lever.

Figure 8 is a sectional view taken generally on line 8—8 of Figure 3 showing the main driving gear and the manner of actuating the timing chain.

Figure 9 is a schematic view showing the vertical positioning of the rotary shaft indexing cam from the timing chain.

Figure 10:
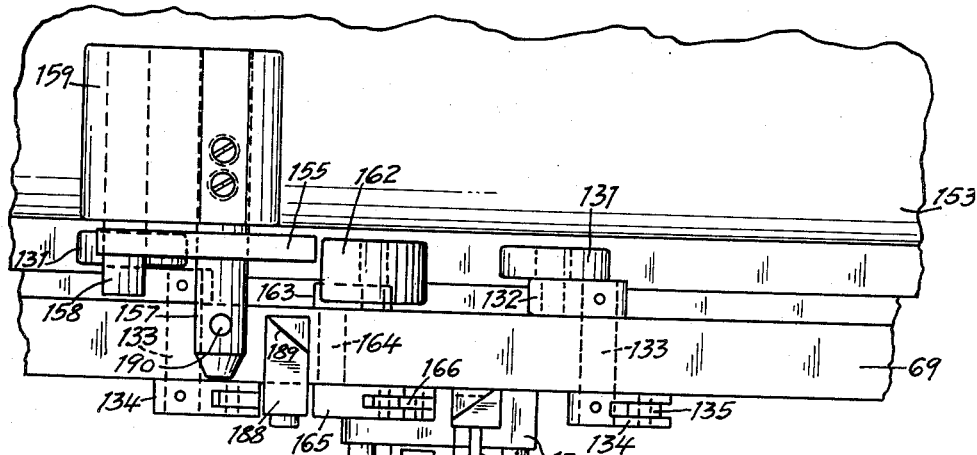

Figure 10 is a partial view in elevation of the interior of the needle cylinder looking outwardly toward the timing chain.

Figure 11:
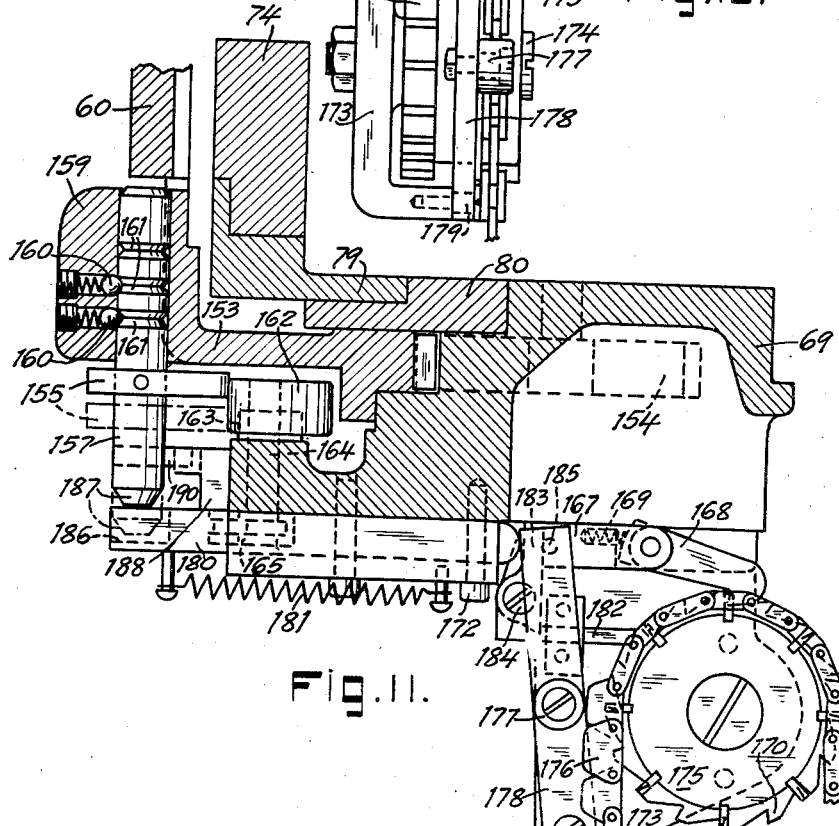

Figure 11 is a sectional view taken generally on the line 11—11 of Figure 8 showing the timing chain with the rotary indexing cam in position to index the timing chain.

Figure 12 is a plan view of the needle-cam-selector drum in position on its vertical indexing shaft.

Figure 13 is a sectional view of the needle-cam-selector drum taken on line 13—13 of Figure 12.

Figure 14 is a detail view in perspective showing one of the L-shaped jacks.

Figure 15 is a plan view of one of the cam sections (one per feed) showing the needle cam control lever and the adjustable stitch cam.

Figure 16 is a side view of the cam section shown in Figure 15 with the control lever in uppermost position.

Figure 17 is a view similar to Figure 16 but with the control lever in lowermost position.

Figure 18 is a view in elevation of the needle side of the cam section of Figure 15.

Figure 19 is a view in elevation of the opposite side of the cam section as shown in Figure 18.

Figure 20:
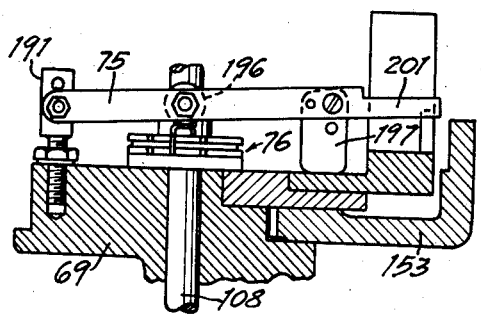

Figure 20 is an illustrative view showing the relationship between the needle cam control lever and its selector drum in which the lever is in uppermost position, which position may be caused by a high jack or by the lever nullifying plate.

Figure 21:
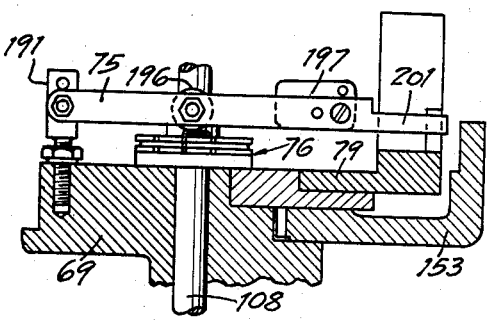

Figure 21 is a view similar to Figure 20 with the lever supported in intermediate position by a low jack in the selector drum.

Figure 22:
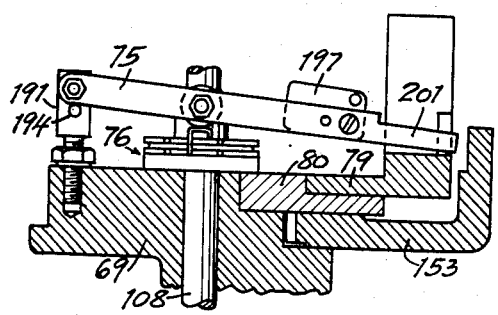

Figure 22 is a view similar to Figure 20 with the lever made inactive in lowermost position by changing its pivot point.

Figure 23:
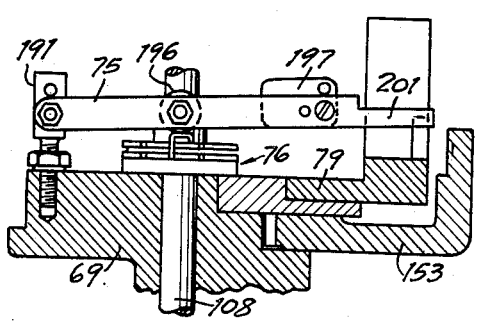

Figure 23 is a view similar to Figure 20 with the lever in uppermost position as supported by a high jack with the nullifying plate in its inoperative position.

Figure 24:
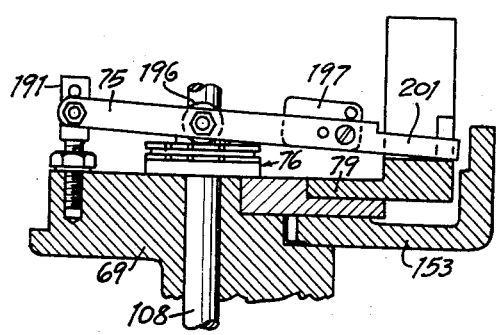

Figure 24 is a view similar to Figure 20 with the lever in lowermost position supported by the drum itself in the absence of a jack.

Figure 25:
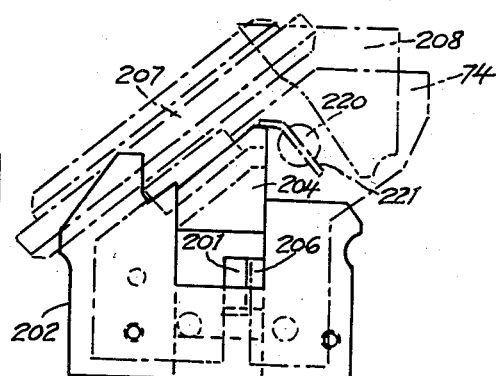

Figure 25 is a diagrammatic view of the cams and the inclined wheel as viewed from the needle cylinder.

Figure 26:
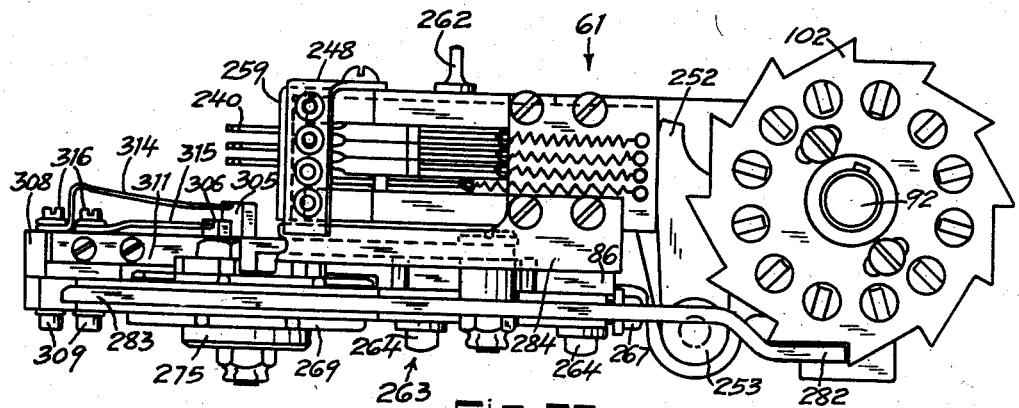

Figure 26 is an assembly view in plan of the unit comprising the striper and the clamp and cutter.

Figure 27:
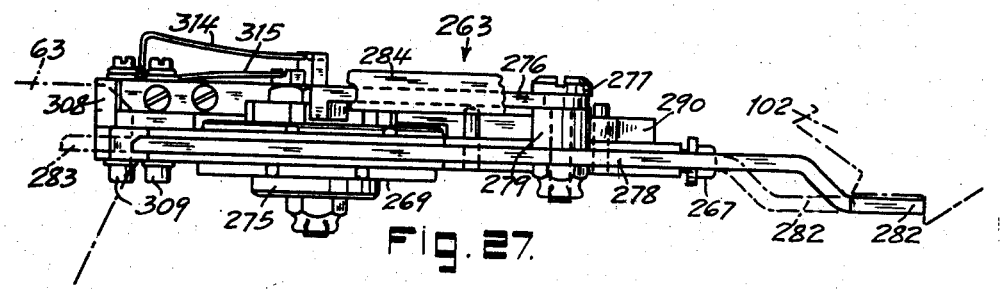

Figure 27 is an assembly view in plan of the clamp and cutter itself.

Figure 28:
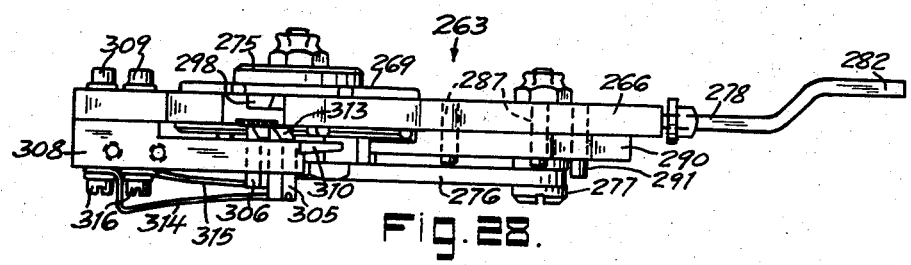

Figure 28 is a bottom view of the clamp and cutter shown in Figure 27.

Figure 29:
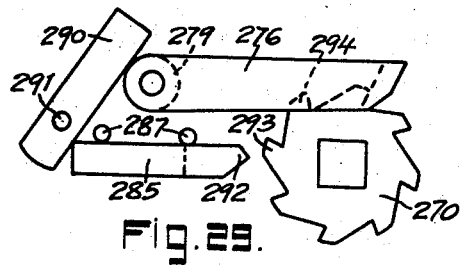
Figure 30:
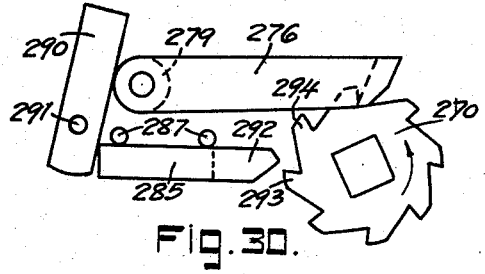

Figures 29 and 30 are illustrative views showing two steps in the operation of the means to prevent overthrowing of a ratchet, the particular ratchet being the one used to index the cutting and pushing blades of the clamp and cutter.

Figure 31 is a plan view of the striper showing the fingers and the striper drum.

Figure 32 is a side view of the striper shown in Figure 31.

Figure 33 is a sectional view of the striper drum taken generally on line 33—33 of Figure 31.

Figure 34 is a perspective view showing the finger moving sliders and one of the levers to move the sliders.

Figure 35 is a sectional view of the finger moving sliders taken on the line 35—35 of Figure 31.

Figure 36 is a view in elevation of the front end of the striper.

Figure 37 is a view in elevation of that side of the clamp and cutter which is adjacent the striper.

Figure 38 is a view in elevation of the side of the clamp and cutter opposite to that shown in Figure 37.

Figure 39 is a detail view in section taken on line 39—39 of Figure 37 showing the mounting of the cutter and pusher blades.

Figure 40 is a detail view in perspective with the stationary cutting blade shown removed from its normal seated position.

Figure 41 is an illustrative view of a portion of the pusher and cutter blades at the beginning or first step of the sequence of operations required to cut and clamp a yarn as it is moved from active to idle position.

Figure 42 is a bottom view of the operating parts of the clamp and cutter during the first step of the operation, showing the yarn in position before the blades are moved.

Figures 43 and 44 are views similar to Figures 41 and 42 with the blades partially rotated and with the pusher blade moving the yarn into the first clamp of the double clamping arrangement.

Figures 45 and 46 are views similar to Figures 43 and 44 with the blades further partially rotated (slightly) just enough to show the yarn cut by the cutting blade and moved further toward the second of the two clamps.

Figures 47 and 48 are views similar to Figures 45 and 46 with the blades further partially rotated and with the pusher blade moving the cut yarn into the second clamp.

Figure 49 is a view similar to Figure 48 with the blades fully rotated and with the cut end of the yarn fully engaged by the two clamps after having been pushed through them by the pusher blade, the Figure 49 showing an additional yarn which is about to be cut and clamped.

Figure 1:
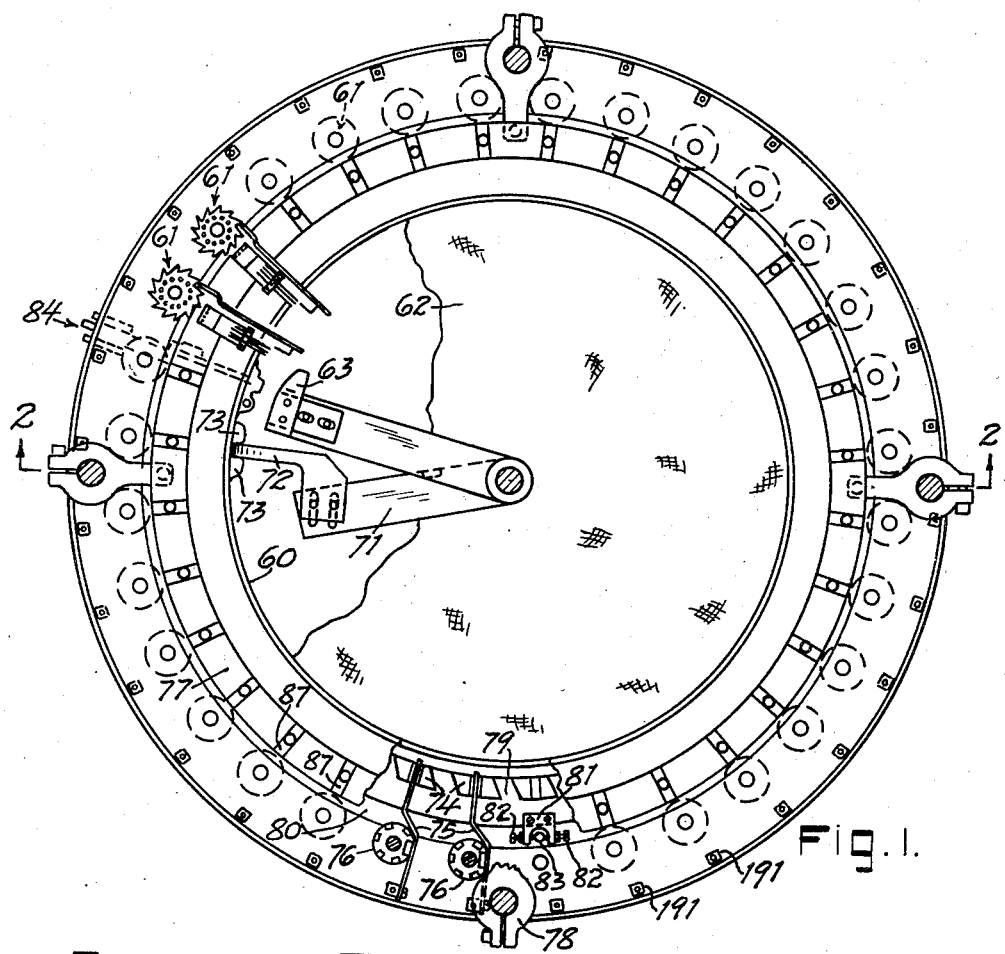
Figure 1 is a plan view, partially in section and partially broken away, showing a multiple feed open top revolving cylinder type of knitting machine with a striper at each of the feeds and with the revolving clamp and cutter actuating cam centrally disposed inside of and driven by the needle cylinder.

The present invention is applicable to circular knitting machines generally and more particularly to multiple feed open or sinker top machines of the type making plain or jersey fabric in order to produce stripes in the fabric and in order to produce designs in the fabric formed by changing the character of the knitting by the independent latch needles. It will be understood that the yarn changing for striping and the stitch changes by the needles may be part of the same fabric design. While the invention is not restricted to a machine having a revolving needle cylinder, it is peculiarly adapted thereto and has been shown in connection with such a machine. As shown in Figure 1, there is a revolving needle cylinder 60 of a multiple feed sinker top machine in which there is a striper 61 at each of the feeds of the machine to feed yarn to the needles for the continuous formation of the fabric, shown at 62. There is a clamp and cutter associated with each of the stripers and the machine is provided with a rotary cam 63 adapted to rotate with the needle cylinder to actuate the clamps and cutters at the proper time. The cam 63 is mounted for radial adjustment on the end of an arm 64 which projects from the tubular member 65 freely rotatable on a shaft 66 which is suitably secured to the stationary upper framing 67 of the machine, the framing 67 being supported by the spaced uprights 68 set in the bed plate 69 of the machine. The collars 70 may be used to position the arm 64 vertically of the shaft 66. The cam 63 is caused to move with the cylinder 60 by reason of a second arm 71 which is circumferentially adjustably connected to a dog arm 72 which in turn is positioned between the inwardly projecting lugs 73, 73 formed on or secured to the needle cylinder. There is sufficient room between the dog arm 72 and the lugs 73 to permit the passage of the fabric 62 therebetween as it is drawn down by the take up and the driving action of the cylinder upon the dog arm 72 does not interfere with the fabric formation.

Figure 2:
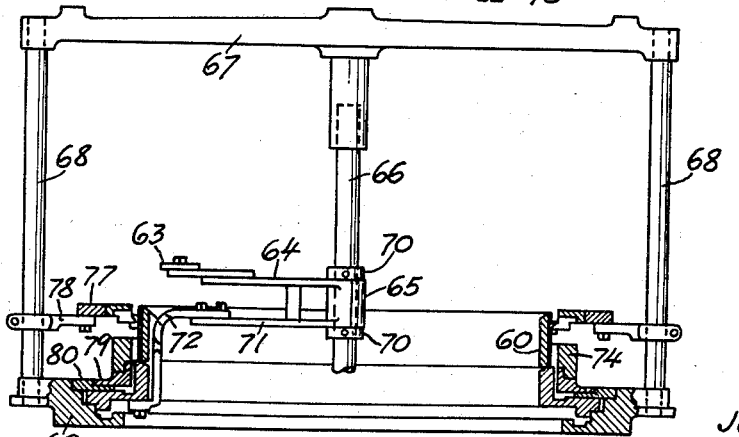
Figure 2 is a section on a smaller scale taken generally on the line 2—2 of Figure 1 to show the mounting of the clamp and cutter actuating cam.

At each of the feeds, in addition to the striper 61, there is a cam section 74 containing certain of the needle actuating cams and the usual inclined needle selecting wheel, the cam section 74 being associated with a needle cam control lever 75 which is moved by a needle-cam-selector drum 76. The striper supporting plate 77 is in turn supported by the arms 78 secured to the uprights 68, see Figure 2. The stripers and the drums 76 are relatively stationary and in order to adjust the cam sections 74 relative thereto, the stationary ring 79 carrying the cam sections 74 is made adjustable circumferentially with respect to the next outer stationary ring 80. This is done by the member 81, secured to the ring 79, which has the opposed adjusting screws 82, 82 adapted to be placed into adjusting contact with the post 83 fast in the ring 80. The timing chain for the machine is indicated generally at 84 in Figure 1.

As seen in Figure 3 each of the stripers 61 is adapted to be secured in place on the plate 77 by a suitable screw 85 passing upwardly through a suitable opening in the plate into threaded engagement with the underside of the striper body casting 86. The screws 85 each pass through a radial keyway 87 cut in the upper face of plate 77 and also pass through a similar keyway 88 cut in the undersurface of the striper body casting 86 and through a key 89 located in the keyways 87 and 88, see Figure 35. Each striper 61 is provided with its own finger selector drum 90 located at the rear of the casting 86, the drum 90 being indexable to present its data to the fingers which in turn present the proper yarns to the needles. The drum 90, comprising a relatively short cylinder, is suitably slidably keyed as at 91 to a short shaft 92 extending through the drum and adapted to be raised and lowered relative to the drum. The drum 90 is seated on and is adapted to rotate about an internal stationary circular plug 93 which extends into the striper casting 86 where it is held by a suitable set screw 94. The drum may be rotatably secured to the plug 93 by means of the screw 95 having a reduced end portion adapted to travel in the circular plug groove 96. The outer peripheral portion of the drum is provided with a series of equally spaced longitudinally extending slots, here shown as twelve in number, into each of which a sliding elongated jack 98 is adapted to be placed. The jacks are each provided with a single protruding butt 99 at one end thereof and with a series of four spaced grooves 100, the jacks being held in place in the drum slots 97 by the garter spring 101 which encircles the drum and fits into a suitably formed annular groove in the outer face of the drum near the upper end thereof. The jacks 98 are adapted to be raised and lowered manually to the desired height for the control of a particular yarn finger and the jacks are held as positioned by the garter spring which fits into the appropriate one of the jack grooves 100, see Figure 33. A thin plate 102, having ratchet teeth for cooperation with the clamp and cutter, is secured to the top of the drum 90 for angular adjustment relative thereto by means of suitable screws 103 which pass through slots in the plate 102 for threaded engagement with the drum 90. The jacks 98 are adapted to pass through suitably formed clearance openings 105 formed in the plate 102 to permit the jacks to be raised as required. The short shaft 92 in its lowered position of Figure 33, where it is yieldingly maintained by a suitably positioned spring pressed ball 106 in the upper of two annular grooves 107, is adapted to turn the drum 90 while the shaft 92 in its upper position of Figure 3, where it is yieldingly maintained by the ball 106 in the lower groove 107, is not in position to turn the drum 90. The shaft 92 when lowered is in driven relationship with an aligned drive shaft 108, the interconnection between the shafts being made by the rectangular shaped key 109 formed at the lower end of the shaft 92 which fits into the slotted keyway 110 formed in the upper end of the shaft 108. The shafts are kept aligned even when in non-driving relation by the pin 111 at the terminal end of the shaft 92 which is adapted to enter a suitable bore 112 in the upper end of the shaft 108, the length of the pin 111 and the bore 112 being such that contact is maintained regardless of the vertical position of the shaft 92. It will be seen, Figure 3, that with the shaft 92 in upper position that the key 109 will be out of keyway 110 and that turning of the shaft 108 will not turn the drum 90. Thus at any time that it is desired to make the drum 90 of any striper 61 inactive at any feed of the machine, it may be done by raising the drum shaft 92. This may be for the purpose of allowing that feed to continue without further striping changes or it may be done to permit manual turning of the drum to a new position or for inspection purposes.

The shaft 108, for each striper 61, is rotatably journaled vertically in the bed plate 69 and has a second selector drum 76 of disk-like shape secured thereto just above the bed plate. This disk drum 76, having selectively positioned inverted L-shaped jacks 113 therein, is used to selectively control the position of needle moving cams in each cam section 74 by means of the lever 75. The disk drum 76 comprises the apertured base member 114 having a flange 115 to which is secured a like diameter ring 116 by means of suitable screws 117 passing through the ring 116 for threaded engagement with the flange 115. The drum 76 is secured in driving relation to the shaft 108 by means of a suitably positioned keyway and key 118 and is further vertically positioned by set screws 119 which engage the shaft 108. The ring 116 is provided with a series of equally spaced generally radially extending slots 120, here shown as twelve in number to correspond to the number of jacks in the drum 90, and is also provided with an annular formed groove in its outer peripheral face to receive the jack holding garter spring 121. Each of the jacks 113, which are of inverted L-shape when in position in the drum 76, have a spring receiving groove 122 formed in the long vertical leg thereof for registry with the spring 121 when the long leg portions of the jacks are placed in the slots 120. The arrangement is such that the leg end 123 rests upon the flange 115 while the short leg end 124 rests upon the ring 116 so that the jack is supported in position to exert a force in a direction axially of the drum 76. The angle of cut of the slots 120 is such that once the jacks 113 are placed therein, the horizontal leg of the jack will extend along the top face of the ring 116 and will be closely adjacent to the outer edge thereof. It should be noted the jacks 113 may come in several heights so that their effective faces may be at different distances above the ring 116. As seen in Figure 21 the jack therein is shorter with the result that it will raise the control lever 75 a lesser distance than will a higher or regular jack of the size shown in Figure 3. It should be noted that the underface of the ring 115 is provided with a series of twelve apertures 125 into which one or more suitably positioned spring pressed balls 126 are adapted to enter to yieldingly maintain the drum 76 in indexed position, see Figure 3.

The shaft 108 extends below the bed 69 sufficiently far to have a ratchet 127 suitably keyed and fastened thereto, the ratchet being used to impart step by step rotation to the shaft 108 which in turn imparts similar rotation to the drums 90 and 76. The means to turn the ratchet 127 are placed in a block 128 secured to the undersurface of the bed 69 by a pair of screws 129 which pass through suitable bores in the block 128 for threaded engagement with the bed. In a slot which is radial of the machine and which is formed in the bed-side of the block, there is a slide 130 adapted to reciprocate when the roller 131 is actuated by a cam which revolves with the needle cylinder. The roller 131 is rotatably secured to a roller arm 132 which in turn is suitably pinned to a short shaft 133 journalled vertically in the bed 69, so that as the roller 131 is moved outwardly of the machine its arm 132 will cause the shaft 133 to be angularly displaced, the outward position of the roller 131 being shown in Figure 6. Other means to be described causes the roller and roller arm to be returned to its inner position. A slide operating arm 134 is suitably fixedly secured to the lower end of the shaft 133 below the bed 69 to transmit the reciprocating motion to the slide 130 through a link 135 which is pivotally secured at its opposite ends within the slotted ends of the arm 134 and the slide 130. A pawl 136 positioned adjacent the bottom face of the block 128 and having an upturned ratchet engaging end is adapted to be reciprocated by the slide 130 to index the shaft 108, the turning motion being in the direction of the arrow in Figure 6 when the roller 131 is moved outwardly. The pawl 136 is pivotally secured at its opposite end to a threaded pin 137 set in the slide 130 and projecting through the slotted opening 138 in the block, a nut 139 holding the pawl 136 in place. A suitably anchored tension spring 140 secured to the pawl 136 constantly urges it into operative contact with the ratchet 127. The head of a set-screw-held screw 141 adjustably mounted in the block 128 is positioned to act as a stop for the outward movement of the slide 130. At times it may be desirable to hold the pawl 136 out of action and this is done with a plate 142 which is positioned on the bottom of the block in co-planar relation to the pawl by a suitable screw 143 which passes through the plate 142 for threaded engagement in the block, the screw when tightened being sufficient to hold the plate 142 in either its full line position of Figure 6 where it does not displace the pawl or to hold the plate 142 in the dotted line position of Figure 6 wherein it displaces the pawl to the dotted line inactive position illustrated. A pin 144 in the block which extends through an opening 145 in the plate 142 acts to limit the plate movement. The block 128 is further provided with means to prevent the overthrowing of the ratchet 127 by the pawl 136 as might otherwise occur due to the rapid indexing action. To this end the underside of the block 128 is provided with a slot 146 parallel to the slide 130 and in which a sliding stop 147 is adapted to reciprocate. The block is slotted at one end thereof crosswise of the slot 146 and the slide 130 as at 152 to accommodate a lever 148 pivotally mounted upon a suitable pin 149, the lever 148 being positioned so that its ends may come into contact with the outer end of the stop 147 and with the enlarged portion 150 of the slide held pin 137. Thus it will be seen that as the slide 130 moves radially inwardly, by the action of the roller 131, the washer 150 will engage one end of the lever 148 to turn the same and cause the other end of the lever 148 to push the stop 147 toward the ratchet 127, it being noted that the stop 147 is co-planar with the ratchet. The ratchet engaging end of the stop is reduced as at 151 and the timing is such, including a certain amount of travel by the slide 130 before the lever 148 is engaged by the slide, that the stop permits one tooth of the ratchet to advance past the stop before it moves into the path of the oncoming next tooth, whereupon the stop 147 is moved its full distance toward the ratchet to engage and positively stop any further angular displacement of the shaft 108.

The rollers 131 for all of the feeds are located at a common level, see Figures 8 and 10, adjacent the inner face of rotary ring gear 153 which supports and drives the needle cylinder 69, the gear 153 being driven by the gear 154 in the usual manner. The inner face of the gear 153 acts to maintain all of the rollers 131 (and a double roller for the timing chain) in their inward position, Figure 8, from which they are adapted to be moved outwardly by a rotating cam 155 when the latter is in its upper active position. The gear ring 153 is cut out at one place at 156 opposite to the cam 155 to permit the rollers to be moved by the cam 155 after which the full face of the gear ring will act to return the rollers 131. In this way the pawls 136 are positively moved in their two directions for action on the ratchets 127. The cam 155 is suitably secured to a vertically movable plunger 157 for movement therewith into the full line and the dotted line positions of Figure 11, the cam 155 having a slotted tail portion which is supportingly guided by a fixed pin 158. The plunger 157 and the pin 158 are carried in a boss 159 formed on the inner face of the gear ring 153 and consequently rotates in unison with the needle cylinder. The plunger is adapted to be held in either of its two vertical positions by the spring pressed balls 160 seated in the boss 159 and which are urged into the appropriate ones of the three spaced annular grooves 161 formed in the plunger. With the plunger 157 and the cam 155 in the upper position of Figures 8, 10, and 11, all of the rollers 131 will be moved for each revolution of the machine during which the cam 155 is so positioned and at the same time the cam 155 will also actuate a double height roller 162 positioned at one point on the machine. By reason of the height of roller 162 it will be actuated by the cam 155 regardless of the position of plunger 157 and therefore the roller 162 is operated once for each rotation of the machine. The movement of roller 162 is used to index the timing chain 84 in the following manner. The roller 162 is rotatably secured to a roller arm 163 which is suitably fixed to the upper end of a short shaft 164 journalled in the bed 69 and a slide actuating arm 165 is suitably fixed to the lower end of the shaft 164. A short link 166 pivotally connected at its ends to the free end of the arm 165 and to one end of a slide 167 acts to transmit the motion of the roller 162 to the slide 167. The slide 167, at its other end, has a pawl 168 pivotally connected thereto and the pawl is yieldingly urged by a compression spring 169 toward a ratchet 170 which is indexed by the pawl. The slide 167 is adapted to move in a slot formed in the bed-site of a small block 171 fastened to the bed 69 by suitable screws 172. A bracket 173 suitably secured to the bed 69 is provided with a stud 174 upon which the ratchet 170 is adapted to rotate, the ratchet having a chain-carrying drum 175 affixed thereto so that the chain 84 is moved as the ratchet 170 is indexed. The chain 84 may be made up with high links 176 disposed at desired places along the chain in accordance with a prearranged plan for the knitted fabric, these high links being adapted to act upon a roller 177 rotatably secured to a lever 178 which is pivotally mounted at one end at 179 upon the bracket 173, to move the free end of the lever 178 to the left in Figure 11 where it will engage and move a slide 180 to the left against the action of a suitably anchored tension spring one end of which is secured to the slide 180. The slide 180 is movable in a suitably formed slot placed in the bed-side of the block 171 and extends from the block 171 (when moved by a high link 176) sufficiently far as to be in the rotary path of the lower end of the plunger 157. It will be understood that when low chain links are under the roller 177 that the spring 181 will withdraw the slide 180 from the path of the plunger 157 and that in this position the slide 180 will have no contact with the plunger. Accordingly it will be seen that the rotary cam 155 acting on the roller 162 has caused the timing chain 84 to be indexed and that such chain movement will cause a high link or links 176 to move the slide 180 into the path of the plunger 157. The forwardly positioned slide 180 is adapted to move the plunger 157, and the cam 155, so that the cam 155 is in position to actuate all the rollers 131. The ratchet 170 may be provided with an overthrow stop, similar to the one described in connection with the ratchet 127, and it may comprise a slidable stop arm 182 which is adapted to be moved into contact with the teeth of ratchet 170 by a lever 183 pivoted at 184 on the bracket 173, the lever 183 being moved by a pin 185 affixed to the slide 167 so that the lever 183 is actuated as the slide 167 is moved to the left in Figure 11 for its indexing stroke.

Normally the plunger 157 revolves in its down position in which the cam 155 does not actuate the rollers 131 but does actuate the roller 162 to index the timing chain. Since the rollers 131 are not moved it follows that the shafts 108 and the drums 76 and 90 thereon are not turned so that knitting proceeds according to the set up of a certain position of the drums 76 and 90. When it is desired that the drums 76 and 90 be moved to make a knitting change, a high link 176 of the timing chain causes the slide 180 to be moved forward to raise the plunger 157 and the cam 155 so that the latter will engage and actuate the rollers 131 to cause the drums 76 and 90 to be indexed to make the knitting change. For this purpose the forward end of the slide 180 is chamfered at 186 to engage the lower tapered end 187 of the plunger as the path of the latter crosses the slide 180 whereby the plunger is raised to its upper position in which it is held by the spring pressed balls 160. The plunger remains in this raised position for substantially a complete revolution of the gear ring 153 to actuate all of the rollers 131 until the fixed plunger lowering member 188, suitably secured to the bed 69, is reached whereupon a chamfered face 189 of the member 188 engages a pin 190 carried by the plunger 157 to lower the latter to dotted line position. Then if the plunger is to be raised for the next revolution of the machine, as determined by the timing chain, the slide 180 will be in its plunger raising position to return the plunger to its upper level. Accordingly for so long as the slide 180 is in its forward position, the plunger will rotate at its upper level but during each such revolution the plunger will be lowered by the member 188 and immediately thereafter will be raised by the slide 180. As soon as the high links of the timing chain pass the roller 177 and the slide 180 is withdrawn, the plunger after being lowered by the member 188 will remain in lowered position until the next high link of the chain becomes effective. The Figure 9 shows the successive positions of the plunger 157 as it is lowered due to the engagement of pin 190 with the member 188 and as it is quickly raised due to the engagement of tapered end 187 with the slide 180. For the time that the plunger is permitted to remain in lower position, the cam 155 will not index the drums 76 and 90 but will continue to index the timing chain 84.

The arrangement of the disk drum 76 and associated parts as they control the needle moving cams will now be set forth and in this connection reference is made to Figure 3 where the control lever of each feed is pivotally mounted at its outer end on a stud 191 adjustably threadedly engaged in the bed plate 69, the lock nut 192 being adapted to position the stud at the proper height above the bed. A shouldered screw 193 which extends through the lower of a pair of bores 194 also extends through a suitable opening in one end of the control lever 75 which is held in place on the stud 193 by a nut 195. A roller 196 is rotatably secured to the lever 75 in position to be engaged by the jacks 113 to raise the lever to move the needle cams. To raise the lever 75 to its upper position and to maintain it there, the lever is provided adjacent its inner end with a pivoted supporting leg 197 which in the dotted line position of Figure 3 will keep the lever in its upper position. The leg 197 comprises a thin rectangular shaped plate pivotally mounted on the lever by the nut and screw 198 which passes through the lever and through the plate adjacent one end thereof. A spring washer interposed between the nut and the plate serves to keep the plate in yielding engagement with the lever. The plate 197 is provided with a pair of integrally formed dimples 199, ninety degrees apart relative to the plate pivot point, which are respectively adapted to enter the hole 200 formed in the lever 75 to maintain the plate in either of its two positions. The lever 75 has its free end reduced as at 201 and this end is adapted to enter a cam section 74 for controlling the cams.

Each feed has an irregularly shaped cam 202 secured to the inner face of an upstanding ledge formed on the stationary ring member 79 and the cam 202 is provided with the centrally disposed slot 203 into which the vertically movable nullifying cam 204 is adapted to slide. The outer face of the cam 202 is undercut in continuation of the slot 203 to accommodate the thinner lower portion 205 of the cam 204. The cam 204 is provided with the side slot 206 into which the end 201 of the lever 75 is adapted to enter so that the cam 204 will move relative to the cam 202 as the lever 75 is raised and lowered. Since the lever is movable to three positions it follows that the cam 204 will likewise be caused to assume three positions, as are shown in Figure 25, the upper one being shown in full lines and the intermediate and lower positions being shown in dotted lines. Considering Figure 25, the cam 204 is adapted to act only upon those needles which pass through the usual inclined design wheel without being raised thereby, so that when the cam 204 is in its lowermost position it is at a level at which it does not touch the wheel-passed needles and permits them to continue at a welt level. When the cam 204 is in its intermediate position it will raise the wheel-passed needles from welt to tuck level and when the cam 204 is in its upper position it will raise all the wheel-passed needles to a plain knit level, thereby erasing the selection made by the wheel 207.

In Figure 20 the leg plate 197 has been turned at this feed to hold the lever 75 in upper position, so that regardless of the jacks or absence of jacks in the drum 76 and regardless whether the drum 76 is indexed, the cam 204 will be constantly held in upper plain knit position. In Figure 21 with the plate 197 in idle position, the roller 196 of the lever 75 rests upon a low jack at this feed so that at this position of the drum 76 the cam 204 will be held in tuck level. In Figure 22 the lever 75 has been made inactive at this feed by changing its pivot point to the upper one of the two bores 194 so that the drum 76 is entirely without effect on the lever 75 and the cam 204 will remain in welt level. In Figure 23 the lever 75 will hold the cam 204 at this feed in plain knit position by the action of a high jack under the roller 196, this is the same level of the cam 204 as shown in Figure 20 but in Figure 23 the lever 75 is raised by a high jack whereas in Figure 20 the lever 75 was raised by the leg plate 197. In Figure 24 the lever 75 rests directly upon the drum 76 at this feed in the absence of a jack to position the cam 204 at the welt level. It should be noted that in Figure 22 where the lever 75 has had its pivot point changed that the drum 76 may be indexed without moving the lever and this is one way to make a drum 76 inactive at a particular feed with the cam 204 at welt level. It should also be noted that in Figure 20 the drum 76 may be indexed without moving the lever 75, since the leg plate 197 supports the lever, and this is one way of making a drum inactive at a particular feed with the cam 204 at plain knit level.

During the knitting of certain fabrics on a multiple feed knitting machine, it is at times desirable that one or more of the feeds be made inactive for one or more courses of knitting and then made active for other knitting courses. Generally this is done at each such feed by withdrawing the yarn from the needles and at the same time causing the needles to remain at either a welt or a tuck level as they pass the feed so that they do not cast off stitches formed at an earlier feed. When a feed is thus thrown out of action it is also desirable to raise the stitch cam at that feed in order that the idle needles will not be depressed the usual stitch-drawing distance for this will tend to distort the stitches then on the needles, these being the stitches drawn at an earlier feed. Then, when an inactive feed is to be made active, the yarn is re-introduced and the stitch cam is lowered to its normal position. In addition to this if any of the needles are to knit plain stitches at the re-activated feed it will be necessary to raise the needle advancing cams. If only welt and tuck knitting was done at the thrown out feed, then the needle advancing cams need not be raised or lowered as the feed is made inactive and is made active. In the present machine the feeds may thusly be controlled from the drum 76 and from the striper 61. At such feeds the wheel 207 is set up so that it does not raise the needles above a tuck level and if plain knitting is to be done then the cam 204 will be raised to its upper level when the feed is active.

In the Figures 15 through 18 the means is shown whereby stitch cam 208 may be raised from its normal full line stitch-drawing position for an active feed to the position shown in dotted lines at 209 for an inactive feed. The stitch cam 208 is suitably secured to a stitch cam post 210 which is mounted for vertical movement in the cam section 74 adjacent the needleside thereof. Secured to the upper end of the post 210 is a plate 211 through which a set-screw-held adjusting screw 212 passes for threaded engagement with the upper part of the section 74, the screw 212 being used to adjust the stitch cam against the plate-raising action of a spring 213 which encircles the screw 212 between the plate 211 and the upper face of section 74. The post 210 is provided with a laterally extending pin 214 by means of which the forward end of an irregularly shaped lever 215 may lower the stitch cam when the lever is moved about its pivot 216, the section 74 being suitably slotted to receive the lever 215. The rear end of the lever 215 is provided with an adjusting screw 217 threaded therein which is adapted to be secured in adjusted position by a plate 218 in threaded engagement at one end thereof with the screw 217 and through the other end of which a screw 219 is adapted to pass for threaded engagement with the lever 215. The lever 215 is adapted to be turned from its idle position of Figure 17 (wherein the stitch cam 208 is in the raised dotted line position 209 under the influence of spring 213) to the position of Figure 16 (wherein the stitch cam is depressed to normal position by the action of lever 215 on pin 214) by the radial outward movement of a plunger 220, the head of the latter engaging the screw 217 to move the lever, the plunger 220 being journalled in the cam section 74. A needle lowering cam 221 is secured to the inner end of the plunger 220 and both of these members are normally maintained in the radially inward position of Figure 17 (wherein the cam 221 is adapted to depress welt level needles passed by the wheel 207) by an encircling spring 222 seated within the section 74. The plunger 220 is adapted to be moved radially outwardly to the position of Figure 16 by a vertically movable plate 223 positioned on the outer face of the section 74, the plate 223 being guided by a projecting pin 224 and by the plunger 220 both of which extend through suitable slotted openings in the plate itself. A tensioned spring 225 anchored on the pin 224 and on a projection 226 of the plate 223 acts to normally hold the plate in the lowered position of Figure 17. The plate 223 is provided with an outwardly offset portion 227 which, when the plate is raised, is forced up under a transversely extending pin 228 set in the plunger 220 so that the pin rides up on the projection 227 to thereby withdraw the plunger against the action of its spring 222. Such upward plate movement causes the withdrawal of the cam 221 and at the same time causes the lowering of the stitch cam 208. The plate itself is moved by the lever 75 which engages an offset 229 of the plate, Figure 19, so that as the drum 76 raises the control lever 75 it causes the cams 221 and 208 to be displaced. It should be noted that the section 74 is provided at its lower portion with a slot 230 through which the lever 75 is adapted to pass for engagement with the cam 204, the section 74 also being provided with the usual forked member 231 upon which the wheel 207 may be secured in the usual manner. It should also be noted that when the lever 75 is lowered by the drum 76, Figure 17, that the spring 225 will act to lower the plate 223 and thus permit the plunger to move inwardly by the action of spring 222 and permit the stitch cam 208 to move upwardly by the action of spring 213.

Referring now to each striper 61, its body casting 86 has a pair of upstanding spaced sides 232 and 233 between which a suitable slot is provided in which four finger-actuating sliders 234, 235, 236, and 237 are adapted to be placed for transmitting the data of the drum jacks 98 to the yarn carrying fingers, the sliders being maintained in the casting by a cover plate 238 overlying them and which is suitably secured to the upper ends of the walls 232 and 233 by screws 239. Four similar yarn fingers 240 are commonly pivotally mounted on a pin 241 extending through and between the side walls 232 and 233 forwardly of the sliders in position to be actuated thereby, the fingers each being individually associated with a single one of the sliders. The sliders are adapted to be normally retained in idle position by individual tension springs 242 suitably anchored to the sliders and to pins set in the cover plate 238, the sliders having the stop faces 243 which take against the cover plate and thus limit the rearward movement thereof. Each of the sliders is provided with a forward overhanging portion 244 the point 245 of which is adapted to contact one side 246 of a notch in a yarn finger 240 adjacent the pin 241 to hold the finger out of action in idle position, as the idle slider 235 is doing in Figure 32, the spring 242 providing the force to thus hold the yarn finger. When a slider is moved forward to active position its overhanging point 245 is adapted to contact the other side 247 of the notch and depress its finger 240 to active feeding position, as the slider 234 is doing in Figure 32. It should be noted that the side 247 of the finger notch is substantially horizontal when the finger is active so that its slider may be overthrown without danger of further turning the finger. Due to the arrangement wherein the finger-notch sides 246 and 247 are so close to the pivot pin 241, it will be seen that each slider need be moved only a relatively short distance to fully move its finger and that accordingly the finger movement is extremely fast. The free ends of the fingers are reduced in width and are provided with suitable yarn carrying holes, the yarns being additionally guided by a suitable yarn-hole-apertured bracket 248 secured to the side of the striper wall 232. To selectively move the sliders and their fingers to active position and hold them there in accordance with the selecting data of the drum 90, a series of four horizontal levers pivoted about a vertical pin is interposed between the drum 90 and the sliders. The levers are indicated at 249, 250, 251, and 252 as pivotally mounted at one end thereof on the common headed-pin 253 suitably anchored in the casting 86, there being spacing washers interposed between the levers. These slider-moving levers are of progressively different lengths with lever 249 being the shortest and lever 252 being the longest, so that they may be individually associated with the sliders. The slider 234 has a rear butt 254 at lowest level for contact with the end of shortest lever 249; the slider 235 has a butt 255 at the next higher level for contact with the end of the next longer lever 250; the slider 236 has a butt 256 at a still higher level for contact with the end of the still longer level 251; and the slider 237 has a butt 257 at the highest of the butt levels for contact with the end of the longest lever 252, so that each of the levers is adapted to move only its associated slider as the levers are actuated by the drum 90. Each of the levers has a curved jack-contacting face 258 of common extent by means of which a jack butt 99 is adapted to engage and move each of the levers to cause the yarn fingers to be made active, the various jack butts 99 being made to exercise their control as the drum 90 is indexed by the means already explained. It should be noted that the lever face 258 is of such length and the jacks 98 are so disposed relative thereto that as each new lever is to be made active its finger moving action will overlap the finger moving action of the lever-to-be-retired for a short period of time so that the retiring yarn will overlap the newly fed yarn for a few needles to insure that all of the needles receive yarn at the yarn change point. The jack butts 99 acting through the levers and sliders hold the fingers in active position so that when the drum is indexed and there is no jack butt in contact with a particular lever, its associated slider and finger will be returned to idle position by a spring 242. It will be seen that there is a single jack butt 99 in each slot 97 of the drum 90 and it may be moved to any of the four levels as required by the fabric design to operate the lever at that level and its associated yarn finger. Each striper 61 is provided with a radially adjustable U-shaped throat plate 259 over which the active yarns are adapted to be fed to the needles, the throat plate having an integral right-angled arm 260 adapted to slide in a slot 261 formed in the outer face of side wall 232 whereby the throat plate may be adjusted relative to the needles and held in adjusted position by a screw 262 passing through an elongated slot in the arm 260 for threaded engagement with the side wall of the striper.

Referring now to the clamp and cutter unit, indicated generally at 263 in Figures 27, 28, 37, and 38 and shown assembled with the striper in Figure 26, it is adjustably secured to the striper casting 86 (on the wall side 233 thereof) by a pair of screws 264 which pass through elongated slots 265 in a main supporting plate 266 of the clamp and cutter for threaded engagement in the striper casting. The clamp and cutter is adapted to be adjusted radially of the machine and relative to the striper by means of a nut 267 in threaded engagement with the plate 266 and extending endwise from its rear edge face so that the underside of the nut head is adapted to overlie an adjacent portion of the striper casting 86 whereby turning the nut 267 will move the plate 266 relative to the striper after which the screws 264 may be tightened to hold the clamp and cutter in adjusted position. The main plate 266 rotatably supports an indexable rotary yarn-pusher blade 268 adjacent the striper-side thereof and also supports an indexable rotary yarn-cutting blade 269 on its opposite side, the two blades being mounted so as to be angularly displaced together when a ratchet 270 associated therewith is indexed. As may be seen in Figure 39, the two blades and the ratchet are mounted upon a bushing 271 so that the ratchet 270 and the pusher 268, each of which is provided with a square centrally disposed aperture, are positioned on a square portion 272 at one end of the bushing on one side of the plate 266 while the cutter 269, also having a square central aperture, is positioned on a smaller square portion 273 at the other end of the bushing on the opposite side of the plate 266, the bushing being round between its square ends for rotary engagement with the plate itself. These parts are held in place by a headed screw 274, passing through the bushing 271, and by a washer 275 secured in place by a suitable lock nut. Accordingly it will be seen that as the ratchet 270 is rotated it will turn the blades 268 and 269 therewith. A pull pawl 276 is provided to index the ratchet 270, the pawl being pivotally mounted at one end thereof on a stud 277 which is suitably secured to a sliding arm 278 adapted to move back and forth in a slot formed in the upper edge portion of the plate 266, the pawl 276 being spaced from the arm 278 by a collar 279 on the stud 277, and the arm 278 being retained in its slot by a screw 280 extending transversely between and in threaded engagement with the walls of the arm-278-slot, the screw 280 passing through an elongated slot 281 in the arm 278. It will be noted that the plate 266 is undercut along its upper edge to provide clearance for the travel of collar 279 and the holding nut for stud 277 as the arm 278 moves back and forth. The arm 278 is adapted to be moved toward the needle circle (this being the idle stroke of the pawl 276) by the teeth of the ratchet plate 102 on the drum 90 as the latter is indexed, each tooth engaging the laterally off set end 282 of the arm to move the latter from the full line to the dotted line positions shown in Figure 27, the movement of the arm 278 placing the pulling end of pawl 276 in position to engage the next tooth of the ratchet 270. The return movement of the arm 278 from dotted to full position (which will cause pawl 276 to index ratchet 270) takes place when the constantly rotating cam 63 engages the end 283 of the arm 278, the forward movement of the arm by the plate 102 having placed the end 283 in the path of the cam 63. A leaf spring 284 secured in place at one end thereof on top of the plate 238 by the screws 239 has its other end overlying the pawl 276 to hold the latter in yielding engagement with its ratchet.

Means is provided to prevent the overthrow of ratchet 270, the means being similar to that used in connection with the ratchets used in the turning of the shaft 108 and the timing chain 84, and the action thereof which is set forth in detail in Figures 29, 30, and 37 is applicable to all of the ratchets. A stop arm 285, adapted to move toward and away from the ratchet 270, is positioned between the striper casting 86 and the plate 266 being slidably supported on a ledge 286 formed in the outer side of the casting and being held on the ledge by a pair of inwardly projecting spaced pins 287 set in the plate 266. It may be noted at this point that the plate 266 is provided with a keyway 288, opposite to a similar keyway in the casing 86 and that a key 289 is adapted to be placed in the two keyways to align the plate 266 when the clamp and cutter unit is secured to the striper. The stop arm 285 is adapted to be moved toward ratchet 270 by a lever 290 pivotally mounted between its ends on a pin 291 set in the plate 266, the lever 290 being in the path of travel of and being turned by the collar 279 as the latter moves with the slide 278 under actuation by the cam 63. As the pawl 276 starts its pulling action on a tooth of the ratchet, the turning lever 290 begins to move the stop arm 285, however the timing arrangement is such that before the tapered stop-arm-end 292 overlaps the travel path of the ratchet teeth the tooth 293 is permitted to pass by the stop arm which continues to move and which enters between the teeth 293 and 294 to come to rest in engagement with the tooth 294, Figure 37, as the latter comes to the end of its desired movement whereby overthrowing of the ratchet is positively prevented. Then when the pawl 276 is given its idle stroke the collar 279 moves away from the lever 290 so that the stop arm end 292 is no longer held against the ratchet and thus at the very beginning of the next indexing of the ratchet the tooth 294 will be free to turn and to move the stop arm 285 away from the ratchet to permit indexing thereof, there being sufficient lost motion in the arrangement of the parts to permit the stop arm 285 to be moved away from and back to stopping position during each power stroke of the pawl 276. It should be noted that the forward end of stop arm 285 is undercut on the plate-266-side thereof to permit the passage of the pusher blade 268 thereby, see Figure 39.

The rotary cutter blade 269 is provided with a series of eight equally spaced projecting cutting arms 295 (equal in number to the number of teeth of ratchet 270) each of which has a sharpened cutting edge 296 adapted to cooperate with the cutting edge 297 of a hardened stationary cutting blade 298 set in the plate 266 to cut the idled yarns upon each indexed movement of the rotary cutter 269. As shown in Figure 40, the blade 298, set in an undercut portion of plate 266, has a pin 299 projecting from its rear upper face for relatively loose engagement in a suitable aperture 301 whereby the blade 298 may be yieldingly held against the rotary cutter 269 by springs 300 seated in the holes 302 to provide the proper cutting relationship between the stationary and the moving blades.

The rotary pusher blade 268 is provided with a series of eight equally spaced projecting yarn-pushing arms 303 each of which has at least one lateral side thereof rounded or tapered as at 304 so that the arms may pass by and momentarily displace each of a pair of clamps 305 and 306 from their spring held position and at the same time push a yarn into position for engagement by the clamps, the yarn or yarns being held between the clamps and the plate 266 which may have an insert of friction material therein, as shown at 307, for engaging the yarns.

The clamps 305 and 306 are mounted in spaced parallel sliding relation in suitable open end slots extending across one end of a small block 308 which is secured adjacent the forward end of plate 266 by a pair of screws 309 which pass through the plate for threaded engagement with the block, the block being provided with a yarn-engaging prong 310 extending from the clamp end thereof toward the yarn fingers. The clamps are secured in the block 308 by a cover plate 311 which is secured to the block by a pair of screws 312 which pass through the plate for threaded engagement with the block. The clamps 305 and 306, each having a chamfered front end 313, are adapted to be yieldingly urged toward the plate 266 by individual wire springs 314 and 315 in engagement respectively with blocks 305 and 306 to press the clamp ends 313 against the friction material 307. These springs, each of which has one end seated in grooves formed in the rear ends of the clamps, are mounted at their opposite ends on the block 308 by individual screws 316 which pass through loops of the springs for threaded engagement in the block.

The action of the clamp and cutter may be more readily understood by referring to Figures 41 through 49 wherein a yarn 317, from an idled one of the yarn guides, is caused to enter the opening in plate 266 and come to rest on the prong 310 as the yarn finger is moved from active to inactive position, the yarn 317 at this time extending from the idled yarn guide to the last of the needles taking the same. At the same time that the drum 90 was indexed to provide for a change of the yarn fingers to make yarn 317 inactive, the ratchet plate 102 moved the sliding arm 278 forwardly so that its end 283 is in the path of the rotary cam 63, the latter cam being adapted to return the arm 278 whereby the pawl 276 will index the ratchet 270 to move the cutter and pusher blades 268 and 269. As the cam 63 moves the arm 278, the rotary blades 268 and 269 begin to turn and since the pusher arm 303 is in advance of the cutter arm 295, it will first engage the yarn 317 and move it toward the clamps. The Figures 41 and 42 show the parts before cam 63 has started to move the arm 278 while the Figures 43 and 44 show a partial movement wherein an arm 303 has moved the yarn into engagement with the end 313 of the clamp 305 and at the same time has moved the clamp 305 outwardly against the action of spring 314 to permit yarn entry and passages of the arm 303. Further movement of the parts by the continued action of cam 63 will bring the pusher arm 303 to a position between the two clamps, see Figure 46 where it will be apparent that the distance between the clamps is such as to accommodate the arm 303 therebetween, with the yarn 317 then held between clamp 305 and the surface 307, the cutting arm 295 having just severed the yarn against the stationary cutter edge 297. Further movement of the parts as seen in Figures 47 and 48 will cause the pusher arm 303 to place the yarn in the clamp 306 and at the same time has moved the clamp outwardly against the action of spring 315 to permit the yarn entry and passage of the arm itself. The final movement of each indexing of the parts then takes place and the arrangement is shown in Figure 49 wherein the arm 303 has passed the second clamp and the yarn is held by both clamps against the surface 307. The parts are now in position for another indexing thereof by the cam 63 as other idled yarns, such as 318, are moved by inactive yarn fingers toward the clamp and cutter. It will be understood that the yarn 318 will be clamped and cut in the same manner in which the yarn 317 was handled and that the clamp and cutter may hold the ends of a plurality of yarns at the same time. As each yarn is to be made active, by moving its finger to active position, it will be caught by the needles and its end will be pulled out of the clamps without disturbing the held ends of the other inactive yarns which are repeatedly urged toward the clamps with each entry of a succeeding one of the arms 303 as each idled yarn is cut and clamped.

From the foregoing description of the invention it will be noted that the pattern or design to be made at each feed (including making this feed inactive at times) is self-contained in the striper drum 90 and in the disk drum 76 associated with each feed; that both of these drums are associated with a single vertical indexable shaft 108 at each feed so that the drums may be simultaneously indexed by a single member; that a single rotary cam is adapted to index all of the shafts 108 in turn according to the high links of a timing chain; that the rotary cam indexes the timing chain at each revolution of the machine; and that in all of the indexing movements the ratchet is positively prevented from being overthrown. The chain-moving-ratchet may be yieldingly maintained in each of its indexed positions by suitable means such as spring pressed balls seated in the bracket and in engagement with suitable apertures in the ratchet after the manner in which the drum 76 is so held.

While a single timing chain has been shown on the machine to raise and lower the rotary cam 155 to index the shafts 108 at one point of the needle circle for one change at each feed per revolution of the machine, it should be apparent that the shafts are only indexed when the cam 155 is raised so that if this cam is raised for a partial revolution only (as may be done by the use of a second timing chain and associated parts) then only those shafts (and feeds) on that portion of the cam ring which are indexed by the cam during its raised period will make a pattern change. In this manner there may be an indexing of the drums at all of the feeds in one or more revolutions of the machine or only the indexing of a group of drums of a corresponding group of feeds for one or more machine revolutions.

We claim:

1. A circular knitting machine having a needle cylinder containing a circular series of vertically movable latch needles, at least one knitting station on said machine, a plurality of movable yarn feeding fingers at said station adapted to be selectively operated, at least one movable needle cam at said station adapted to be selectively operated, an indexable shaft associated with said station and disposed parallel to said needles, and a pair of spaced selector drums on said shaft and indexable therewith, one of said drums selectively operating said yarn fingers while the other drum selectively operates said cam.

2. A knitting machine as set forth in claim 1 in which there is a plurality of movable needle cams at said station of which one is a needle advancing cam and at least one other is a needle retracting cam and in which said other drum selectively operates said plurality of needle cams.

3. A knitting machine as set forth in claim 1 in which there is a plurality of movable needle cams at said station of which one is a needle advancing cam and two others are needle retracting cams and in which said other drum is adapted to simultaneously operate said plurality of needle cams.

4. A knitting machine as set forth in claim 1 in which there are three movable needle cams at said station of which one is a three-position vertically movable needle advancing cam, a second of which is a two-position vertically movable needle retracting cam and the third of which is a radially movable needle retracting cam, and in which said other drum selectively operates said three needle cams, 5. A knitting machine as set forth in claim 1 in which one of said drums is so associated with said shaft as to be selectively made free of the indexing movement thereof whereby said one drum is adapted to remain in stationary non-indexed position when said shaft is indexed.

6. A knitting machine as set forth in claim 1 in which said finger operating drum has an axially movable drive shaft extending therethrough for operative engagement with said indexable shaft, said drive shaft being selectively movable out of operative engagement with said indexable shaft to prevent indexing of said finger operating drum.

7. A multiple feed knitting machine having a revolving needle cylinder containing a circular series of vertically movable latch needles, a stationary knitting station for each of said feeds, each station having a selectively operable striper and at least one selectively operable movable needle actuating cam, each station also having a vertically disposed indexable shaft associated therewith, a pair of spaced selector drums operatively associated with each shaft and movable therewith, the upper of said drums being a part of said striper while the lower of said drums operates said cam, and a selectively positionable cam rotating in unison with said needle cylinder and adapted to index each of said shafts in succession as said cam revolves relative thereto.

8. A knitting machine as set forth in claim 7 in which the machine is provided with an indexable chain and in which said rotating cam is adapted to index said chain as said cam revolves relative thereto, the chain being adapted to selectively place said rotating cam in active shaft indexing position for one or more revolutions of the machine.

9. A knitting machine as set forth in claim 8 in which the machine is adapted to move said rotating cam out of shaft indexing position at each revolution of the machine and in which said chain may move said rotating cam into shaft indexing position at each revolution of the machine, the two movements of the cam taking place between a pair of knitting stations, the said rotating cam indexing the said chain regardless of its shaft indexing position, the rotating cam remaining out of shaft indexing position until moved into indexing position by the chain.

10. A knitting machine as set forth in claim 8 in which each of the shafts and the chain is provided with a ratchet and pawl mechanism for the indexing thereof and in which the rotating cam is adapted to give the pawls their ratchet-moving-strokes and in which the pawls are positively moved through their idle strokes.

11. A knitting machine as set forth in claim 8 in which each of the shafts is provided with a ratchet and pawl mechanism of which the pawl is operatively related to a horizontal roller disposed at a certain level and in which the chain is provided with a ratchet and pawl mechanism of which the pawl is operatively related to a horizontal roller disposed at said certain level and at a level adjacent thereto, in which said rotating cam is adapted to revolve at said certain level to move all of said rollers to index all of said ratchets and in which said rotating cam is also adapted to revolve at said adjacent level to move only said chain roller to index only said chain ratchet.

12. A circular knitting machine having a needle cylinder containing a circular series of vertically movable latch needles, at least one knitting station on said machine, at least one movable cam at said station adapted to be selectively operated, an indexable shaft associated with said station and disposed parallel to said needles, a selector drum on said shaft and indexable therewith to selectively operate said cam, and a lever operatively related to said drum and to said cam to move said cam in accordance with the data of said drum, said lever extending generally radially of the machine with one end thereof operatively associated with said cam and with the other end thereof pivotally mounted, the association between said drum and said lever and said data being such that said cam may be moved to any of three positions.

13. A circular knitting machine having a needle cylinder containing a circular series of vertically movable latch needles, at least one knitting station on said machine, at least one movable cam at said station adapted to be selectively operated, an indexable shaft associated with said station and disposed parallel to said needles, a selector drum on said shaft and indexable therewith to selectively operate said cam, and a lever operatively related to said drum and to said cam to move said cam in accordance with the data of said drum, said drum having an upper face and said data comprising jacks selectively positioned in said drum to extend upwardly from its face to move said lever, certain of said jacks being longer than others thereof whereby said lever may be raised to a plurality of levels.

14. A circular knitting machine having a needle cylinder containing a circular series of vertically movable latch needles, at least one knitting station on said machine, at least one movable cam at said station adapted to be selectively operated, an indexable shaft associated with said station and disposed parallel to said needles, a selector drum on said shaft and indexable therewith to selectively operate said cam, and a lever operatively related to said drum and to said cam to move said cam in accordance with the data of said drum, said lever being provided with means whereby the relationship of said lever to said drum may be changed so that the data of said drum is not effective to move said cam.

15. A circular knitting machine having a needle cylinder containing a circular series of vertically movable latch needles, at least one knitting station on said machine, at least one movable cam at said station adapted to be selectively operated, an indexable shaft associated with said station and disposed parallel to said needles, a selector drum on said shaft and indexable therewith to selectively operate said cam, and a lever operatively related to said drum and to said cam to move said cam in accordance with the data of said drum, said lever extending generally radially of the machine with one end thereof associated with said cam and with the other end thereof pivotally mountable at either of two levels, the said lever when pivotally mounted at the upper of the two levels being so disposed relative to said drum that said data is not effective to move said cam.

16. A circular knitting machine having a needle cylinder containing a circular series of vertically movable latch needles, at least one knitting station on said machine, at least one movable cam at said station adapted to be selectively operated, an indexable shaft associated with said station and disposed parallel to said needles, a selector drum on said shaft and indexable therewith to selectively operate said cam, and a lever operatively related to said drum and to said cam to move said cam in accordance with the data of said drum, said lever extending generally radially of the machine with one end thereof operatively associated with said cam and the other end thereof pivotally mounted, said lever having an auxiliary leg adapted to be selectively placed in position to raise said lever so that the data of said drum is not effective to move said cam.

17. In a striper for a knitting machine, a plurality of adjacent movable yarn fingers pivotally mounted upon a horizontal pin for movement toward and away from the needle circle, a like plurality of generally radially movable finger-moving sliders each of which is associated with one of said fingers, a like plurality of levers pivotally mounted upon a vertical pin for movement of said sliders, and a selector drum adapted to selectively move individual ones of said levers to move the sliders and fingers associated therewith, each of said fingers being provided with a notch adjacent its pivot point whereby the associated slider is adapted to engage the opposite sides of said notch to move said finger, one side of said notch being substantially horizontal when said finger has been moved toward said needle circle.

References Cited in the file of this patent

UNITED STATES PATENTS

| | | |
|---|---|---|
| 1,245,371 | Noyes | Nov. 6, 1917 |
| 1,780,328 | Ames | Nov. 4, 1930 |
| 1,883,337 | Collar | Oct. 18, 1932 |
| 1,940,598 | Larkin | Dec. 19, 1933 |
| 2,075,077 | Aaronson | Mar. 30, 1937 |
| 2,166,716 | Chandler | July 18, 1939 |
| 2,316,822 | Thurston et al. | Apr. 20, 1943 |
| 2,411,795 | Lawson | Nov. 26, 1946 |
| 2,539,790 | Mishcon et al. | Jan. 30, 1951 |
| 2,549,701 | Mishcon et al. | Apr. 17, 1951 |
| 2,680,961 | Thurston | June 15, 1954 |
| 2,757,526 | Crawford | Aug. 7, 1956 |

FOREIGN PATENTS

| | | |
|---|---|---|
| 258,988 | Great Britain | Oct. 7, 1926 |